Aug. 14, 1951 P. C. STEIN 2,563,971
SEALING RING
Filed Sept. 5, 1946 2 Sheets-Sheet 1
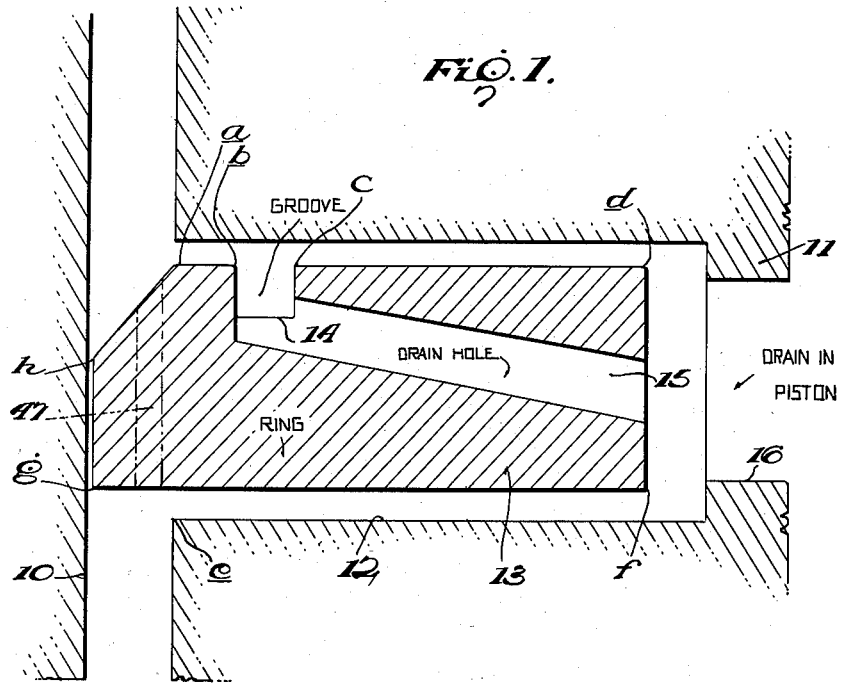
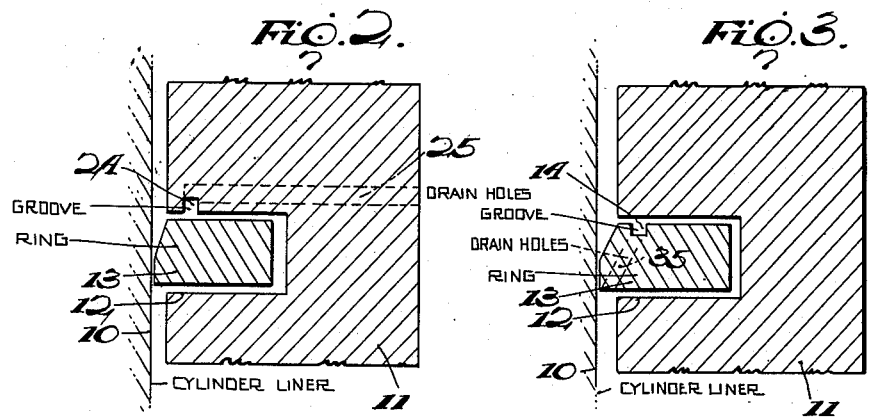
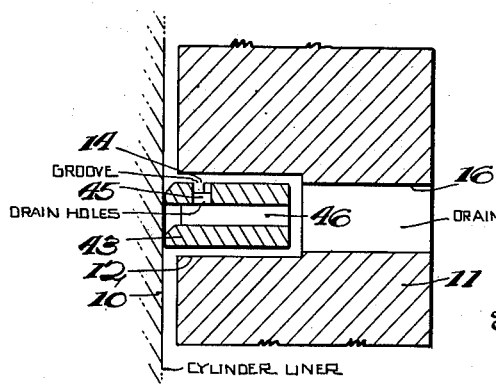
Inventor
P. Charles Stein
By Cameron, Kerkam & Sutton
Attorney

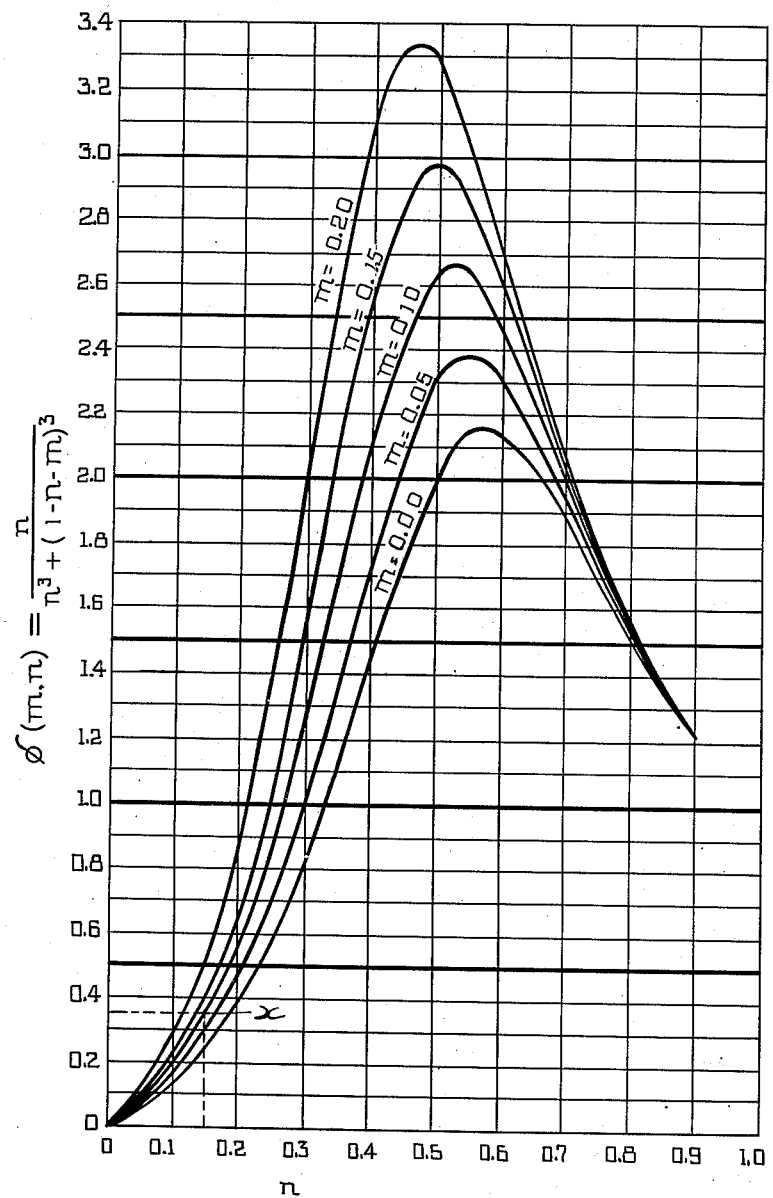

Patented Aug. 14, 1951

2,563,971

UNITED STATES PATENT OFFICE 2,563,971

SEALING RING

Philip Charles Stein, Upper Darby, Pa.

Application September 5, 1946, Serial No. 694,923

10 Claims. (Cl. 309—45)

This invention relates to devices for sealing the clearance space between relatively reciprocating parts, as sealing and oil control rings of internal combustion and steam engines, sealing rings for piston rods, reciprocating pumps and the like, and other comparable applications.

For purposes of exemplifying the invention it will be explained by reference to its application to oil control rings of internal combustion engines, but as the invention is based broadly on the mechanism of escape of lubricating oil or other fluid past members for sealing the clearance spaces between relatively reciprocating surfaces, the general considerations entering into its application to piston rod ring seals for engines and pumps as well as other suitable applications thereof are much the same as for oil control rings as hereinafter explained.

Assuming a vertically arranged cylinder and piston of an internal combustion engine, when the piston travels on its downward stroke, the piston ring scrapes the lubricant from the cylinder liner. The lubricant accumulates at the leading side of the ring until a slug of lubricant has been built up in the clearance space between the liner and piston. Analysis of the hydrodynamics of the flow of such a slug of lubricant indicates that the pressures built up at the underside of the ring are proportional approximately to the viscosity of the lubricant, to the length of the slug, to the velocity of the piston with respect to the liner and to the reciprocal of the square of the clearance distance between the face of the piston and the face of the liner. If the clearance between the piston and the liner is small, very large intensities of pressure can be built up under the ring. These large fluid pressures cause the escape of oil through the narrow paths existing between the lower and upper surface of the ring and the opposing surfaces of the groove in which the ring is located and between the edge of the ring and the liner. The mechanism just described takes place not only during the downward motion of the piston, but also during the upward stroke. On the upward stroke, the slug of oil in the clearance space tends to accumulate above the ring, and some of the lubricant escapes downward through the same passageways. The net passage of lubricant under the action of the mechanism just described is the difference between the amount of lubricant escaping upward through the passageways around the ring and the amount escaping downward through these passages.

Some measure of control of the flow of lubricant due to this mechanism is possible by providing drains from the ring groove to the interior of the piston and by variation of the clearances of the piston and liner and of the ring and the ring groove, but these clearances affect the escape of lubricating oil under the action of other mechanisms which are also responsible for the passage of lubricating oil past a seal ring.

A second important mechanism which affects the passage of lubricant past a seal ring is that involving the squeezing of the lubricant from the clearance space between the top of the ring and the top of the groove. For example, during operation when the piston is in the upper part of the cylinder, the inertia force of the ring is upward and tends to press the ring against the top face of the groove. Any oil in the clearance space above the ring will tend to be squeezed out, part flowing toward the rear of the ring and part flowing toward the face of the piston. Part of the oil reaching the face of the piston will be deposited on the surface of the cylinder liner above the ring. Since the direction of the inertia force on the ring remains upward during the first part of the downward stroke, this mechanism can leave a film of oil on the cylinder liner above the seal ring. During the first part of the upward stroke, the clearance space above the ring can be refilled with oil, so that the process just described can be repeated at every stroke.

A third important mechanism involves the lateral motion of the piston due to the change in direction of the lateral component of the connecting rod thrust. As the ring is forced deeper into the groove by the piston motion, pressure can be developed in the oil behind the seal ring in the ring groove. The pressure occasioned by this action can cause some of the oil behind the ring to escape toward the liner through the clearance gaps between the ring and the groove. Prevention of excessive lubricating oil escape due to this mechanism is accomplished in internal combustion engine practice by adequate drainage of the back of the ring grooves in the piston. In general, this latter mechanism is of less importance in relation to the invention described herein.

From the foregoing it is apparent that at each stroke of the piston a substantial quantity of oil squeezed from the clearance space between the upper face of the ring and the opposing face of its groove is left on the cylinder liner where it is in position to be acted on by the next higher ring on the piston which repeats the described action, and so on until the upper ring or rings leave the escaped oil in the combustion chamber. Thus, in the aggregate, with ordinary oil-controlled rings, relatively large quantities of oil are displaced to and consumed in the combustion space.

It is an object of this invention to provide a sealing device which avoids the aforesaid progressive displacement of undesired quantities of oil or other fluid to a position wherein it is wasted.

Another object of this invention is to provide a device of the type referred to whereby the saving of substantial quantities of lubricating oil may be effected.

Another object of this invention is to provide a device of the type referred to which operates on a new principle to effect an increased flow of oil downwardly with respect to the ring.

Another object of this invention is to provide a device of the type referred to which is simple and yet highly effective in reducing undesired escape of fluid between relatively reciprocating surfaces.

Other objects will appear as the description of the invention proceeds.

The invention is capable of receiving a variety of mechanical expressions some of which are shown on the accompanying drawings but it is to be expressly understood that the drawings are for purposes of illustration only, and are not intended to be definitions of the limits of the invention, reference being had to the appended claims for that purpose.

Referring in detail to the drawings wherein like reference characters are employed to designate corresponding parts, Fig. 1 is a diagrammatic view showing the invention applied to a piston ring with the clearance spaces exaggerated;

Figs. 2, 3 and 4 are corresponding views on a smaller scale illustrating other embodiments of the invention; and Fig. 5 is a chart illustrating the critical relationship existing between the width of the groove in the top face of the ring and its spacing from the outer edge of the ring.

Referring first to Fig. 1, 10 designates a fragment of a cylinder wall or liner and 11 designates a fragment of a piston reciprocating in the cylinder and provided with a groove 12 in which is disposed a ring 13. Disposed in the upper face of said ring is a groove 14 located and of a width as hereinafter explained, said groove having a suitable number of drain holes 15 communicating therewith while the groove 12 has in communication therewith suitable drains 16 through which oil may return to the crank case by way of the interior of the piston.

The action of an oil control ring can now be understood by reference to Fig. 1 wherein $a$ is the outer edge of the top surface of the ring, $b$ and $c$ are the outer and inner edges of the groove 14, $d$ is the inner edge of the top surface of the ring, $e$ and $f$ define the width of the coacting surfaces between the bottom of the ring and its groove 12, and $g$ and $h$ define the bottom and top edges of the clearance between the periphery of the ring and the cylinder. In the case of the first mechanism above described, the escape of oil from the slug of oil under the ring during the downward stroke must be through the paths $e$—$f$ and $g$—$h$. The opening along $g$—$h$ is very narrow because the usual ring is constructed like a spring so that it will press firmly against the cylinder wall. The opening along $e$—$f$ can be as much as the clearance of the ring in the groove, which will ordinarily amount to a thousandth of an inch or more. The flow of oil along the path $e$—$f$ will vary directly with the pressure difference between $e$ and $f$, and the cube of the clearance space and inversely with the viscosity of the oil and the distance from $e$ to $f$. If other factors such as clearance and viscosity remain the same, a ring like that shown in Fig. 1 with a short distance $a$—$b$ will offer less resistance to the flow of oil along the path $a$—$b$ than along the path $e$—$f$. Because of this, any oil scraped from the cylinder wall during the upward stroke will not accumulate as a slug in the clearance space between the piston and the liner ahead of the ring, but will flow into the groove 14 where it passes through the drains 15 and 16 back to the crank case. As a result, a slug of oil will not be carried along to the uppermost position of the ring to be left stranded on the cylinder liner as the piston starts its down stroke. Thus, the oil above the ring can be removed instead of being carried upward to a position where other rings of the piston can pick it up and carry it to the top of the liner.

The effect of the present invention on the control of the amount of lubricant squeezed out of the clearance space above the ring by the second mechanism above described can be evaluated by a simple hydrodynamic analysis. If the lubricant in the clearance space between $a$ and $d$ is considered to be a fluid between two plane plates of finite width and of infinite length, the conditions of flow will closely approximate the conditions in this groove clearance space. Consider that one of the plates is being pressed toward the other by a force uniformly distributed over the area of the plate. Analysis of this case, assuming laminar flow of the fluid and neglecting inertia forces in the fluid itself, leads to the result that the rate of flow toward each edge of the plates varies directly as the magnitude of the force per unit length of the plates and as the cube of the distance by which the plates are separated and inversely as the viscosity of the fluid and the square of the width of the plates. This relation may be applied as an approximate solution of the squeezing mechanism in a ring.

If a drain is placed in the upper face of the ring, then the case is that of two pairs of plates setting side by side. Referring to Fig. 1, if we let the total width of the space $a$, $d$ containing the oil film be designated by L and the widths of the space outside the drain $a$, $b$ and of the drain $b$, $c$ be given as L multiplied by the fractions $n$ and $m$, respectively, the amount of oil being squeezed past point $a$ in unit time is given by $$q = \frac{Fh^3}{5\mu L^2}\phi(m,n)$$

in which $q$ is the rate of flow per unit length of ring, $h$ is the clearance between top of ring and top of groove, F is the force per unit length of ring, $\mu$ is the viscosity of the oil and $\phi(m,n)$ is a mathematical function of the fractions $m$ and $n$. If the factor $\phi(m,n)$ is omitted, the equation gives the rate of oil flow past the point $a$ for the ring without the drain. If there be a drainage groove of width $(m \times L)$ in the top of the ring, so located that its outer edge is $(n \times L)$ from the outer edge of the clearance space, then the flow of oil is given by the equation as written.

The significance, then, of the term $\phi(m,n)$ is that of a non-dimensional multiplier expressing the ratio of the rate of flow from the clearance space with a ring having a drainage groove to the rate of flow with an ungrooved ring, all geometry except that occasioned by the grooving being the same. The meaning of $\phi(m,n)$ is given by the algebraic expression on the left side of Fig. 5, to wit $$\phi(m,n) = \frac{n}{n^3 + (1-n-m)^3}$$

Fig. 5 also shows calculated values of $\phi(m,n)$ for various values of $m$ and $n$.

Fig. 5 thus shows the relative effect of grooves of various widths ranging from a theoretical zero width to a width of 20% of the width of the ring. Curves are drawn for zero, 0.05, 0.10, 0.15, and 0.20 times the ring width. The abscissae give the ratio of the distance from the outer edge of the groove to the outer edge of the clearance space to the total width of the clearance space, the width of the clearance space being slightly smaller than the width of the ring. The ordinates indicate the value of $\phi(m,n)$. When the value of $\phi(m,n)$ is 1.00, the flow of oil to the outer edge of the clearance space is the same as that for the ungrooved ring.

It will be seen from Fig. 5 that, depending on the width of the groove, the distance from the outer edge of the groove to the outer edge of the clearance space must be not more than approximately 0.33 times the width of the ring in order that the value of $\phi(m,n)$ may be less than unity, that is, in order that the grooved ring reduce the amount of oil squeezed out of the clearance space to below that obtained with an ungrooved ring. The figure also shows that a narrow groove, assuming adequate drainage therefrom, is more effective in causing a reduction in oil flow from the clearance space than is a wide groove. As an example in the use of the figure, assume a ring with a top groove having a width equal to 10% of the width of the ring. Assume that the distance from the outside edge of the groove to the outer edge of the clearance space is 0.15 times the ring width. On the curve marked "$m=0.10$" for a value of $n$ of 0.15, the value of $\phi(m,n)$ is 0.35 at point $x$. This would mean that the flow of oil from the clearance space above the grooved ring would be 35% of the flow from the clearance space above an ungrooved ring, the dimensions of the ring and groove being the same.

While the foregoing analysis shows that a narrow groove spaced closely to the outer edge of the ring is desirable there are certain practicable limits imposed on the width of the groove in order to obtain adequate drainage and on the width of the spacing of the groove from the edge of the ring under manufacturing tolerances because the groove must not be so near the edge that it ever becomes uncovered by the upper wall of the groove 12. In practice a groove $\frac{1}{32}$ inch wide and having its outer edge about $\frac{1}{32}$ inch from the outer upper edge of the ring represents feasible dimensions for large diameter rings. Any suitable number of drains 15 may be used depending, of course, on the length of the groove 14 as determined by the diameter of the piston. Thus sixteen drains of $\frac{1}{16}$ inch have been found to be satisfactory for a $\frac{1}{32}$ inch groove used in a ring on a piston of 9½ inches in diameter. The number and size of the drains 16 must also be such as to assure free escape of the oil from the groove 12 back through the body of the piston.

Practical use of the invention in a Diesel engine employing a piston 9½ inches in diameter with standard scraper rings $\frac{7}{16}$ inch in width, to cite one example, the upper surface of the ring being provided with a groove $\frac{1}{32}$ inch wide having its outer edge $\frac{3}{64}$ inch in from the outermost periphery of the ring and said groove drained by sixteen $\frac{1}{16}$ inch holes, gave a reduction in lubricating oil consumption of from 71% to 74% when compared with ungrooved rings, all other conditions being kept the same as nearly as possible.

Instead of placing the groove and drain holes in the top surface of the ring the groove may be placed in the upper surface of the groove 12 as shown at 24 in Fig. 2 with drain holes 25 communicating therewith. Instead of holes, drain grooves in the upper surface of the ring or the upper surface of the groove 12 may be used. While it is preferred to drain the groove to the rear of the ring at least some of the advantage of the present invention can be obtained if the drain holes lead to the lower outermost portion of the ring as shown at 35 in Fig. 3. Where a ventilated single piece ring or a double ring is used as shown at 43 in Fig. 4, the groove 14 may drain through holes 45 into the open space 46 of the ring. Grooves of various other configurations may be used, and some of the advantages of the invention can be obtained even though the groove be discontinuous or replaced by the entrances to a sufficient number of drain passages leading from the upper clearance between the ring and its groove at the location above explained.

Inasmuch as rings designed in accordance with this invention can be made to practically eliminate the flow of lubricating oil past the ring, it will be desirable, in some cases, to make the ring a metering device for lubricating oil control. This may be done by drilling holes through the ring as shown in dotted lines at 47 in Fig. 1 or providing other suitable channels of proper dimension to act as metering orifices. It is the intent to include such provisions as part of the invention.

While the invention has been shown as applied to only one ring it may obviously be applied to as many rings as desired on a given piston, and while the invention has been shown as applied to a piston ring it will be apparent that it may be applied to numerous other forms of sealing rings where displacement of oil or other fluid is to be diminished. While the invention has been shown as applied only to the inner of two reciprocating parts it will be apparent that it is equally applicable when the outer part is the relatively movable part in which event the distance $n$ would be measured from the inner top edge of the ring. The ring may also be mounted in the stationary of the relatively reciprocating parts by properly disposing the grooved face to prevent the undesired displacement of the fluid in conformity with the foregoing principles.

I am aware that it has heretofore been proposed, as in the patent to Olson et al., No. 1,636,012, granted July 19, 1927, to provide a piston ring with a groove in its upper face midway of its width but such a groove has been used and is only capable of use to increase the supply of oil to the upper clearance space between the ring and the wall of its groove. On the other hand, it will be perceived that the present invention provides a simple but highly effective device for preventing undesirable quantities of lubricating oil or other fluid from being advanced by a seal ring to the upper clearance space where it is wasted.

While the illustrated embodiments have been described with considerable particularity it is to be expressly understood that the invention is not limited thereto, as other embodiments and other ways of applying the principles above disclosed will suggest themselves to those skilled in the art without departing from the spirit of this invention. Reference is therefore to be had for a definition of the limits of the invention to the appended claims wherein that face of the ring, shown as upper on the drawings, which defines the clearance space to be drained in conformity with the foregoing principles when undesired displacement of a fluid is to be prevented, together with the corresponding wall of the groove, will for convenience be designated as "upper" as it has throughout the foregoing specification without regard to the actual orientation of the parts when in service.

What is claimed is:

1. In a device for sealing the clearance between relatively reciprocating parts, one of said parts being provided with a groove, a ring in said groove and fluid drainage means communicating with the annular clearance space between the upper face of the ring and the opposed face of its groove, the radial width of the space between the edge of the clearance space contiguous to the other part with respect to which relative reciprocation is taking place and the point where the nearer edge of said drainage means communicates with said clearance space being not more than 33% of the total radial width of said clearance space.

2. In a device for sealing the clearance between relatively reciprocating parts, one of said parts being provided with a groove, a ring in said groove, a circumferential groove in one of the opposed surfaces defining the annular clearance space between the upper face of the ring and the opposed face of its groove and means for draining fluid from said circumferential groove, the radial width of the space between the edge of the clearance space contiguous to the other part with respect to which relative reciprocation is taking place and the nearer edge of said circumferential groove being not more than 33% of the total radial width of said clearance space.

3. In a device for sealing the clearance between relatively reciprocating parts, one of said parts being provided with a groove, a ring in said groove, a circumferential groove in one of the opposed surfaces defining the annular clearance space between the upper face of the ring and the opposed face of its groove and means for draining fluid from said circumferential groove, the radial width of the space between the edge of the clearance space contiguous to the other part with respect to which relative reciprocation is taking place and the nearer edge of said circumferential groove being not more than 33% of the total radial width of said clearance space and the width of the latter groove being not more than 20% of the total radial width of said clearance space.

4. In a device for sealing the clearance between relatively reciprocating parts, one of said parts being provided with a groove, a ring in said groove, a circumferential groove in one of the opposed surfaces defining the annular clearance space between the upper face of the ring and the opposed face of its groove and means for draining fluid from said circumferential groove, the radial width of the space between the edge of the clearance space contiguous to the other part with respect to which relative reciprocation is taking place and the nearer edge of said circumferential groove and the width of the latter groove being such as to give the mathematical function $$\frac{n}{n^3+(1-n-m)^3}$$

a value substantially less than unity where $n$ and $m$ are respectively the ratios of the first named width and of the second named width to the total radial width of said clearance space.

5. In a device for sealing the clearance between relatively reciprocating parts, one of said parts being provided with a groove, a ring in said groove, the upper face of said groove opposite the upper face of said ring having a circumferential groove and means for draining fluid from said circumferential groove, said latter groove being opposed to that half of said upper face of the ring which is contiguous to the part with respect to which reciprocation is taking place with the radial distance between the portion of said ring defining the edge of the annular clearance space between said ring and the opposed surface of said groove which is contiguous to the part with respect to which relative reciprocation is taking place and the edge of said circumferential groove which is nearer thereto being not more than 33% of the total radial width of said clearance space.

6. In a device for sealing the clearance between relatively reciprocating parts, one of said parts being provided with a groove, a ring in said groove and fluid drainage means communicating with the annular clearance space between the upper face of the ring and the opposed face of its groove within the area of that half of said upper face which is contiguous to the other part with respect to which relative reciprocation is taking place, and fluid drainage passages additional to said fluid drainage means extending between the upper and lower faces of said ring.

7. In a device for sealing the clearance between relatively reciprocating parts, one of said parts being provided with a groove, a ring in said groove, a circumferential groove in one of the opposed surfaces defining the annular clearance space between the upper face of the ring and the opposed face of its groove and means for draining fluid from said circumferential groove, the radial width of the space between the edge of the clearance space contiguous to the other part with respect to which relative reciprocation is taking place and the nearer edge of said circumferential groove and the width of the latter groove being such as to give the mathematical function $$\frac{n}{n^3+(1-n-m)^3}$$

a value substantially less than unity where $n$ and $m$ are respectively the ratios of the first named width and of the second named width to the total radial width of said clearance space, and fluid drainage passages additional to said fluid draining means extending between the upper and lower faces of said ring.

8. A sealing ring having a pair of parallel annular plane faces and a circumferential drainage groove in one of said faces of such width and so located that, when the ratio of the radial width of said circumferential drainage groove to the radial width of said face is designated $m$ and the ratio of the distance from the outer edge of said circumferential drainage groove to the outer edge of said face is designated $n$, the value of the mathematical function $$\frac{n}{n^3+(1-n-m)^3}$$

is substantially less than unity.

9. A sealing ring having a pair of parallel annular plane faces and a circumferential drainage groove in one of said faces with the distance between the outer edge of said groove and the outer edge of said face being not more than 33% of the total radial width of said face.

10. A sealing ring having a pair of parallel annular plane faces and a circumferential drainage groove in one of said faces with the distance between the outer edge of said groove and the outer edge of said face being not more than 33% of the total radial width of said face and the width of said groove being not more than 20% of the total radial width of said face.

PHILIP CHARLES STEIN.

REFERENCES CITED

The following references are of record in the file of this patent:

UNITED STATES PATENTS

| Number | Name | Date |
|---|---|---|
| 953,627 | Leighton | Mar. 29, 1910 |
| 1,519,697 | North | Dec. 16, 1924 |
| 1,636,012 | Olson | July 19, 1927 |
| 1,780,697 | Benton et al. | Nov. 4, 1930 |
| 1,984,409 | Godron | Dec. 18, 1934 |
| 2,006,902 | Morton | July 2, 1935 |
| 2,048,258 | Godron | July 21, 1936 |
| 2,052,642 | Miller | Sept. 1, 1936 |

FOREIGN PATENTS

| Number | Country | Date |
|---|---|---|
| 11,039 | Australia | Dec. 28, 1928 |
| 674,505 | France | Jan. 29, 1930 |